(12) United States Patent
Noro et al.

(10) Patent No.: US 8,098,263 B2
(45) Date of Patent: Jan. 17, 2012

(54) IMAGE PROCESSING METHOD AND IMAGE PROCESSING APPARATUS

(75) Inventors: Hideo Noro, Tokyo (JP); Yukio Sakagawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 729 days.

(21) Appl. No.: 10/594,114

(22) PCT Filed: May 27, 2005

(86) PCT No.: PCT/JP2005/010202
§ 371 (c)(1),
(2), (4) Date: Sep. 25, 2006

(87) PCT Pub. No.: WO2005/116938
PCT Pub. Date: Dec. 8, 2005

(65) Prior Publication Data
US 2007/0146390 A1   Jun. 28, 2007

(30) Foreign Application Priority Data
May 28, 2004 (JP) .................................. 2004-159833

(51) Int. Cl.
*G09G 5/00* (2006.01)
(52) U.S. Cl. ......................................................... 345/619
(58) Field of Classification Search ............... 345/8, 619
See application file for complete search history.

(56) References Cited

U.S. PATENT DOCUMENTS

| | | | | |
|---|---|---|---|---|
| 5,590,062 A | * | 12/1996 | Nagamitsu et al. ................. | 703/6 |
| 5,803,738 A | * | 9/1998 | Latham ............................ | 434/29 |
| 6,166,744 A | * | 12/2000 | Jaszlics et al. .................... | 345/629 |
| 6,396,497 B1 | * | 5/2002 | Reichlen ......................... | 345/427 |
| 6,408,257 B1 | * | 6/2002 | Harrington et al. ............ | 702/150 |
| 6,466,232 B1 | * | 10/2002 | Newell et al. ................... | 715/700 |
| 6,522,312 B2 | | 2/2003 | Ohshima et al. ................... | 345/8 |
| 6,625,299 B1 | * | 9/2003 | Meisner et al. ................ | 382/103 |

(Continued)

FOREIGN PATENT DOCUMENTS

JP   11-136706   5/1999

(Continued)

OTHER PUBLICATIONS

Lescinsky et al.; "Interactive Scene Manipulation in the Virtue3D System," ACM Weg3D'02, pp. 127-135, Feb. 24-28, 2002, Tempe, Arizona, ACM 1-58113-468-1/02/0002.*

(Continued)

*Primary Examiner* — Xiao Wu
*Assistant Examiner* — Edward Martello
(74) *Attorney, Agent, or Firm* — Fitzpatrick, Cella, Harper & Scinto

(57) ABSTRACT

An image processing apparatus has an operation panel to display an operation panel image used for editing the virtual object, and capable of receiving a user instruction of editing the virtual object, and an operation panel image generation unit to generate the operation panel image by using the data held in the database. A rendering unit updates data held in the database according to the user instruction and the measurement result of the second measurement unit, and renders, by using the updated data, the image of the virtual object according to the measurement results of the first and second measurement units. A composition unit composites the rendered image of the virtual object and the captured image of the physical space to generate the mixed reality image, and an HMD displays the generated mixed reality image.

7 Claims, 6 Drawing Sheets

U.S. PATENT DOCUMENTS

| | | | |
|---|---|---|---|
| 6,629,065 B1 * | 9/2003 | Gadh et al. | 703/1 |
| 6,683,607 B1 | 1/2004 | Matsuda et al. | 345/419 |
| 6,972,734 B1 * | 12/2005 | Ohshima et al. | 345/8 |
| 7,056,216 B2 | 6/2006 | Ohshima et al. | 463/36 |
| 2001/0038378 A1 * | 11/2001 | Zwern | 345/156 |
| 2003/0142067 A1 * | 7/2003 | Kurtenbach et al. | 345/156 |
| 2004/0104935 A1 * | 6/2004 | Williamson et al. | 345/757 |
| 2005/0116964 A1 | 6/2005 | Kotake et al. | 345/629 |
| 2007/0006091 A1 | 1/2007 | Sakagawa et al. | 715/771 |

FOREIGN PATENT DOCUMENTS

| | | |
|---|---|---|
| JP | 2000-353248 | 12/2000 |
| JP | 2001-60275 | 3/2001 |

OTHER PUBLICATIONS

Althoff et al.; "A Generic Approach for Interfacing VRML Browsers to Various Input Devices and Creating Customizable 3D Applications," ACM Weg3D'02, pp. 67-74, Feb. 24-28, 2002, Tempe, Arizona, ACM 1-58113-468-1/02/0002.*

* cited by examiner

IMAGE PROCESSING METHOD AND IMAGE PROCESSING APPARATUS

TECHNICAL FIELD

The present invention relates to a technique of presenting a virtual object superimposed on a physical space to an observer.

BACKGROUND ART

Some conventional 3D CAD browsing tools display a CAD object as a virtual object on a display such as a CRT or on the display unit of an HMD in combination with the VR technology.

In recent years, studies about mixed reality (to be referred to as "MR" hereinafter) which aims at seamless combination of the physical space and virtual space have extensively been done. MR aims at coexistence of the physical space and the virtual reality (to be referred to as VR hereinafter) world which can conventionally be experienced only in a situation isolated from the physical space and provides MR by combining an image in the physical space with an image in the virtual space (e.g., Japanese Patent Laid-Open No. 11-136706).

In the former case, since the sense of actual size is absent, it is difficult to grasp the size of a designed object. In addition, since a pointing device such as a mouse is used to observe a target CAD object from various directions, complex and time-consuming operations are necessary to change the position and orientation of the object and the viewpoint and line of sight of the observer.

In the latter case as well, since comparison to an object which exists in the physical world is impossible, the size and the like of a designed object are hard to grasp.

Generally, to browse 3D CAD data, many operations are required to observe an object from various directions, select some parts, or set the non-display mode. In the latter system, however, it is difficult to mount a complex user interface because the program is based on cumbersome 3D CG.

DISCLOSURE OF INVENTION

The present invention has been made in consideration of the above-described problems, and has as its object to provide a technique for more easily browsing and manipulating a virtual object in a virtual space.

In order to achieve an object of the present invention, for example, an image processing method of the present invention comprises the following arrangement.

That is, an image processing method of presenting a virtual object superimposed on a physical space to an observer, characterized by comprising:

a holding step of holding, in a memory, information of a state of each virtual object included in a virtual space;

an association step of associating at least one virtual object included in the virtual space with at least one position/orientation sensor which is held in a hand of the observer and manipulated;

a layout step of laying out, in the virtual space, the virtual object associated with the position/orientation sensor in the association step in accordance with a position and orientation of the position/orientation sensor itself, which are determined on the basis of a measurement result by the position/orientation sensor;

a presentation step of presenting the state of each virtual object included in the virtual space to the observer on the basis of the information held in the holding step;

an input step of inputting an operation to change a desired one of the states presented in the presentation step; and an updating step of updating the information in accordance with the operation input in the input step.

In order to achieve an object of the present invention, for example, an image processing method of the present invention comprises the following arrangement.

That is, an image processing method including acquiring position and orientation information of an observer, acquiring an image of a physical space;

generating an image of a virtual space in accordance with the position and orientation information of the observer, and compositing the image of the physical space and the image of the virtual space and displaying the composited image on a head mounted display worn by a user, characterized by comprising:

generating an operation panel image and compositing the operation panel image with the image of the physical space and the image of the virtual space;

acquiring position information of an operation unit operated by the observer; and updating the operation panel image in accordance with a positional relationship between the operation panel image and the operation unit, wherein in the operation panel image, a part selected by the operation unit is enlarged.

In order to achieve an object of the present invention, for example, an image processing apparatus of the present invention comprises the following arrangement.

That is, an image processing apparatus for presenting a virtual object superimposed on a physical space to an observer, characterized by comprising:

holding unit adapted to hold information of a state of each virtual object included in a virtual space;

association unit adapted to associate at least one virtual object included in the virtual space with at least one position/orientation sensor manipulated by the observer;

layout unit adapted to lay out, in the virtual space, the virtual object associated with the position/orientation sensor by the association unit in accordance with a position and orientation of the position/orientation sensor itself, which are determined on the basis of a measurement result by the position/orientation sensor;

presentation unit adapted to present the state of each virtual object included in the virtual space to the observer on the basis of the information held by the holding unit;

input unit adapted to input an operation to change a desired one of the states presented by the presentation unit; and updating unit adapted to update the information in accordance with the operation input by the input unit.

Other features and advantages of the present invention will be apparent from the following description taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

BEST MODE FOR CARRYING OUT THE INVENTION

Preferred embodiments of the present invention will now be described in detail in accordance with the accompanying drawings.

First Embodiment

Figure 1:
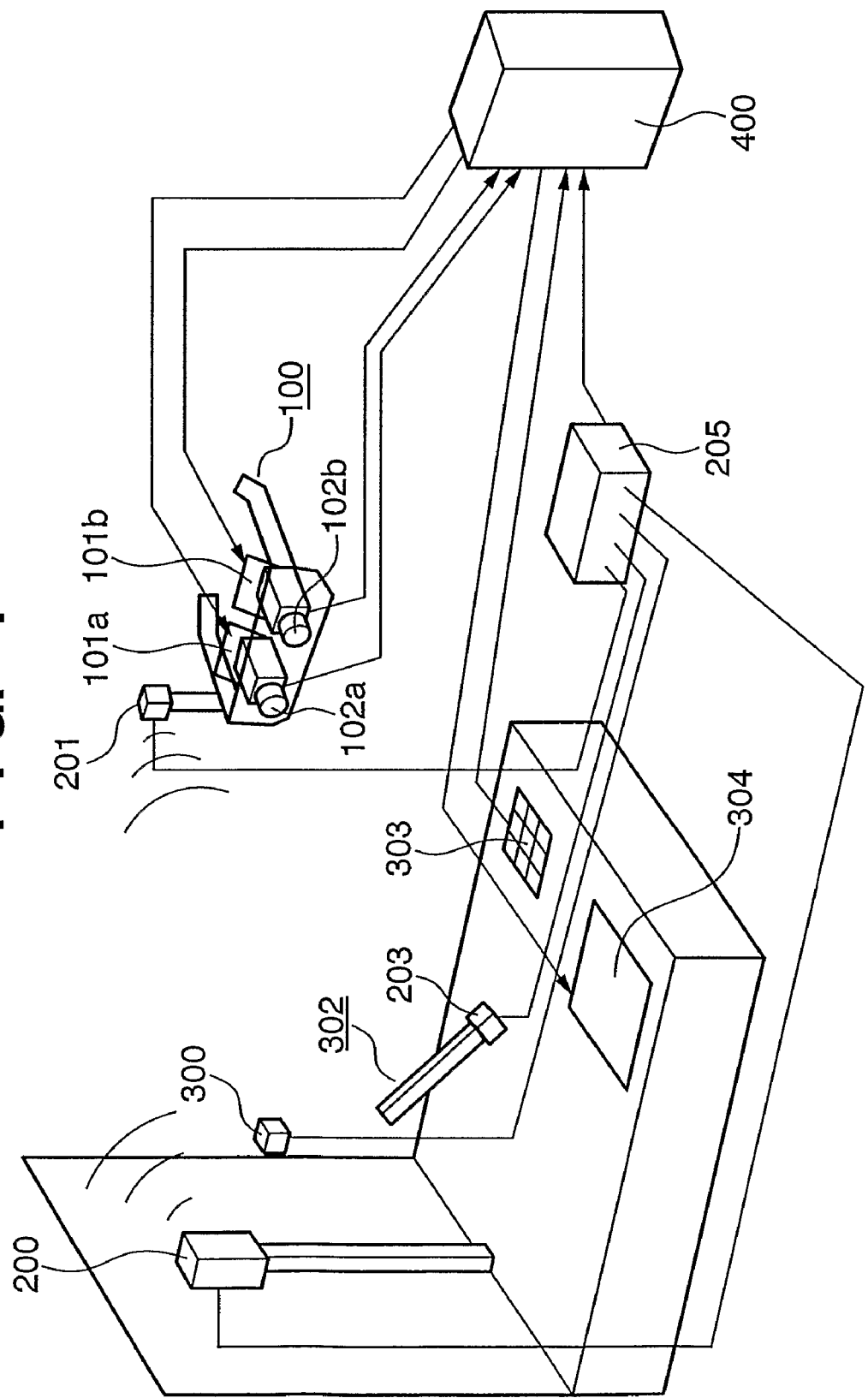
FIG. 1 is a view showing the outer appearance of a system according to the first embodiment of the present invention, which provides, to an observer, a mixed reality space obtained by superimposing a virtual space on the physical space and makes it possible to browse and manipulate a virtual object in the virtual space.

FIG. 1 is a view showing the outer appearance of a system according to the first embodiment of the present invention, which provides, to an observer, a mixed reality space obtained by superimposing a virtual space on the physical space and makes it possible to browse and manipulate a virtual object in the virtual space.

Referring to FIG. 1, a transmitter 200 generates a magnetic field. A head mounted display (to be referred to as an HMD hereinafter) 100 is mounted on the head of an observer to provide an image obtained by compositing the physical space and virtual space in front of his/her eyes. The HMD 100 includes cameras 102a and 102b, display devices 101a and 101b, and a magnetic receiver 201.

The cameras 102a and 102b continuously sense the physical space viewed from the positions of the right and left eyes of the observer who wears the HMD 100 on the head. Each sensed frame image is output to a computer 400 of the subsequent stage.

The display devices 101a and 101b are mounted in the HMD 100 such that they are located just in front of the right and left eyes of the observer when he/she wears the HMD 100 on the head. The display devices 101a and 101b display images based on image signals output from the computer 400 of the subsequent stage. Hence, images generated by the computer 400 are provided in front of the right and left eyes of the observer.

The magnetic receiver 201 detects a change in magnetic field generated by the transmitter 200 and outputs a detection result signal to a position/orientation measuring device 205 of the subsequent stage. The detection result signal indicates a change in magnetic field, which is detected in accordance with the position and orientation of the magnetic receiver 201 in a coordinate system (to be referred to as a sensor coordinate system hereinafter) in which the origin is set at the position of the transmitter 200, and three axes crossing each other perpendicularly at the origin are set as X-, Y-, and Z-axes. The position/orientation measuring device 205 obtains the position and orientation of the magnetic receiver 201 in the sensor coordinate system on the basis of the signal. The data representing the obtained position and orientation is output to the computer 400 of the subsequent stage.

Figure 2:
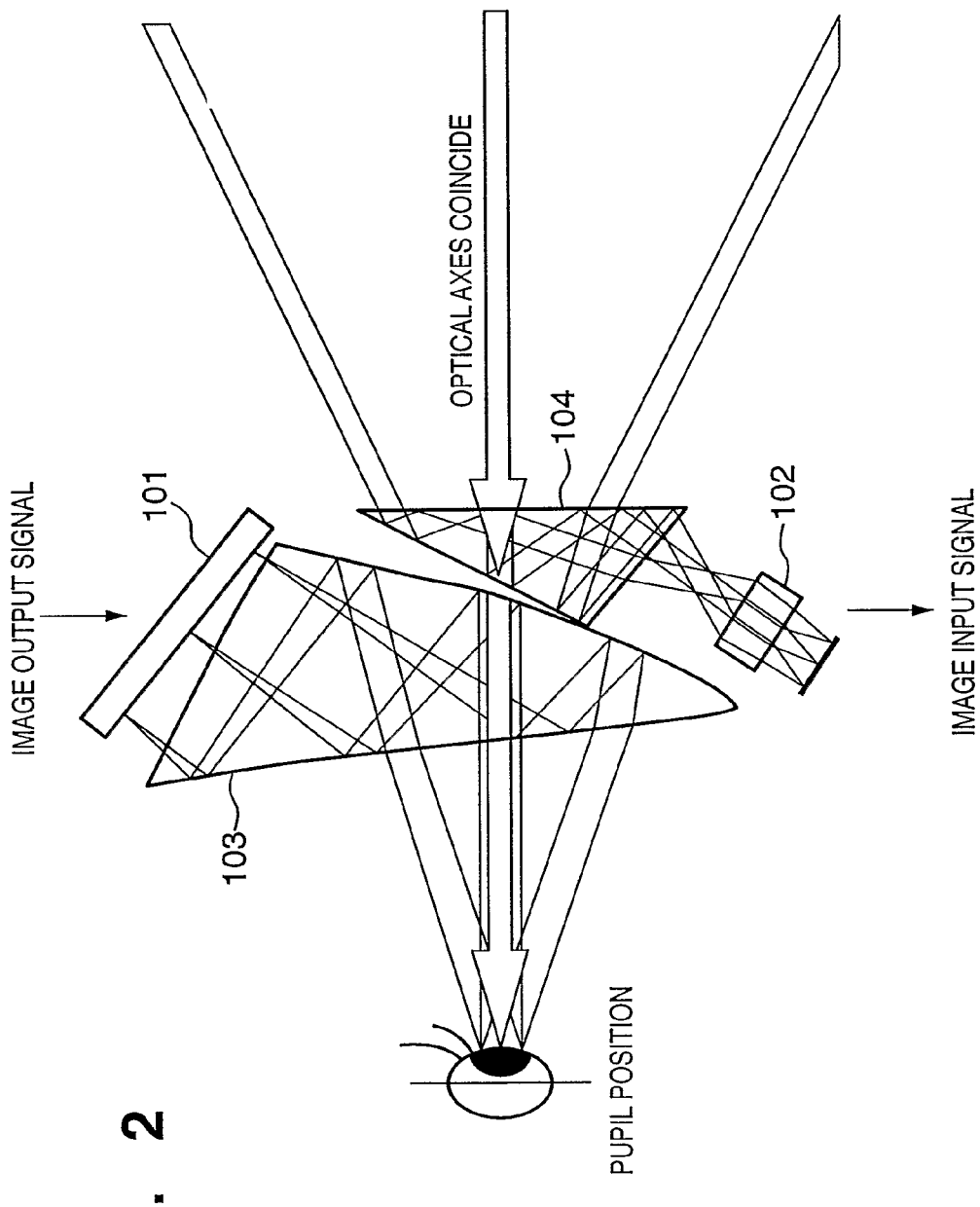
FIG. 2 is a view showing the detailed structure of an HMD 100.

FIG. 2 is a view showing the detailed structure of the HMD 100.

An image display device 101 is formed from a small liquid crystal display device having a size of 0.5 to several inches. A free surface prism 103 serves as a lens to enlarge the image on the image display device 101. With this structure, the image displayed on the image display device 101 is presented to the observer as, e.g., an image having a size of 90 inches at a position 2 m ahead.

An image input device 102 is formed from an image sensing device such as a CCD camera or CMOS camera. An image sensing system prism 104 serves as a lens to converge light in the physical space to the image input device 102. The image sensing system prism 104 is arranged outside the free surface prism 103 so that their optical axes match. With this structure, the disparity between the image input by the image input device 102 and the image displayed on the image display device 101 can be eliminated, and the image in the physical space can be played back without any sense of discomfort.

Referring back to FIG. 1, a 3D pointing device 300 (position/orientation sensor) incorporates a magnetic receiver (not shown). When the observer holds the 3D pointing device 300 in hand and changes its position and orientation, the magnetic receiver (not shown) outputs, to the position/orientation measuring device 205, a signal (i.e., signal indicating the position and orientation of the magnetic receiver (not shown) itself in the sensor coordinate system) indicating a change in magnetic field, which is detected in accordance with the position and orientation of 3D pointing device 300 in the coordinate system, like the magnetic receiver 201. On the basis of this signal, the position/orientation measuring device 205 can obtain the position and orientation of the magnetic receiver in the sensor coordinate system. The data representing the obtained position and orientation is output to the computer 400 of the subsequent stage. The observer takes the 3D pointing device 300 in hand and manipulates it to change the position and orientation of a virtual object (i.e., virtual object as an observation target) which is associated with the 3D pointing device 300 in advance. Use of the 3D pointing device 300 will be described later.

A 3D pointing device 302 is used for a purpose different from that of the 3D pointing device 300 and incorporates a magnetic receiver 203, like the 3D pointing device 300. Hence, the position and orientation of the 3D pointing device 302 itself in the sensor coordinate system can be obtained, like the 3D pointing device 300. The observer holds the 3D pointing device 302 in hand and manipulates it to, e.g., designate a section of a virtual object or select a part of the virtual object. Use of the 3D pointing device 302 will be described later.

An operation panel display device 304 functions as a display device to display the image of an operation panel (to be described later). The image of the operation panel is generated by the computer 400 of the subsequent stage and output.

An input device 303 is used by the observer to input an instruction in accordance with contents displayed on the operation panel display device 304. Use of the input device 303 will be described later.

The computer 400 executes processing of generating image signals to be output to the display devices 101a and 101b of the HMD 100 or operation panel display device 304 or receiving and managing data from the position/orientation measuring device 205.

Figure 3:
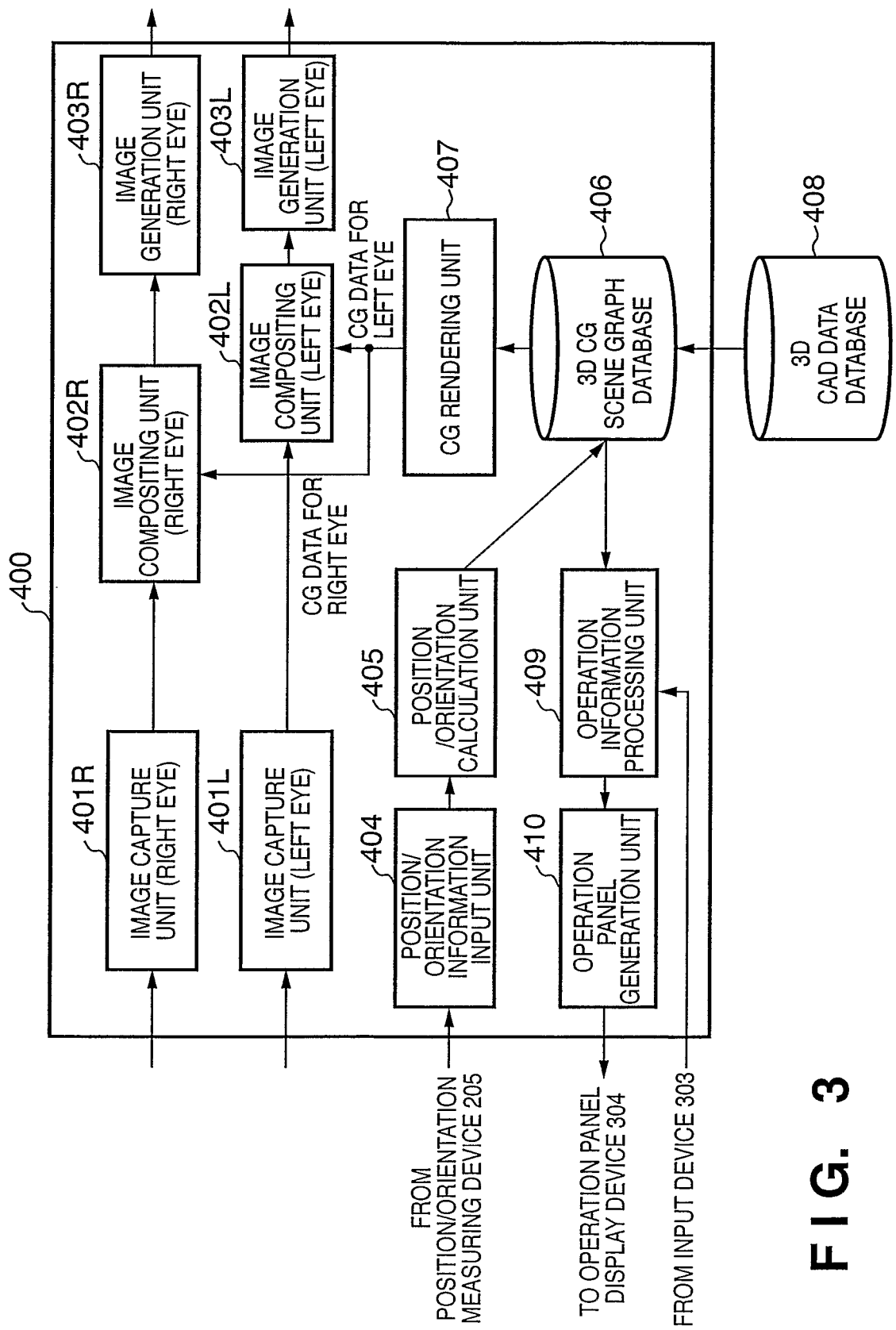
FIG. 3 is a block diagram showing the functional arrangement of a computer 400.
Figure 4:
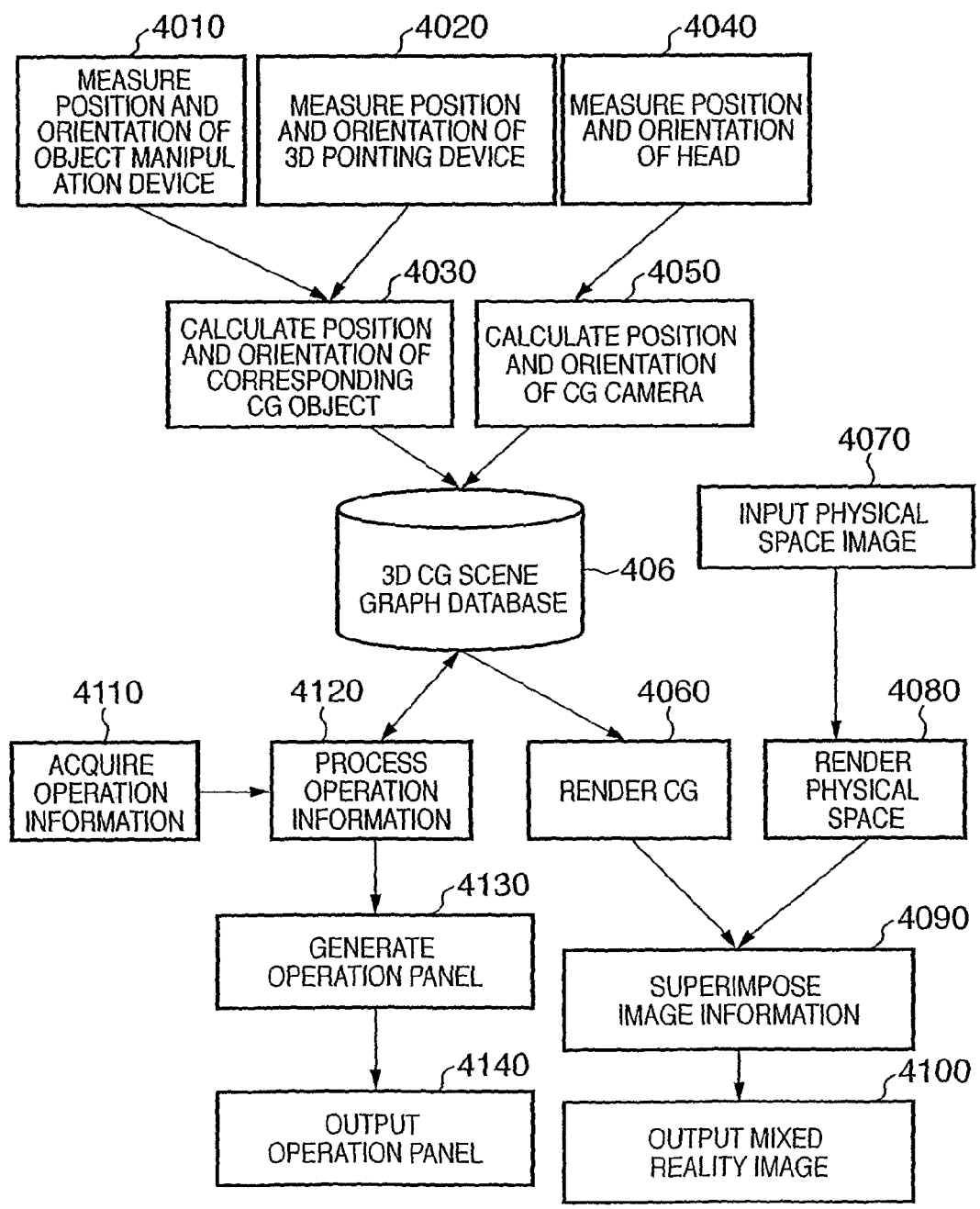
FIG. 4 is a flowchart showing processing executed by the units of the computer 400.

FIG. 3 is a block diagram showing the functional arrangement of the computer 400. In this embodiment, the respective units shown in FIG. 4 are formed by hardware.

Image capture units 401R and 401L capture images input from the cameras 102a and 102b, respectively.

A position/orientation information input unit 404 receives data output from the position/orientation measuring device 205. This data contains data representing the position and orientation of the magnetic receiver 201 in the sensor coordinate system, data representing the position and orientation, in the sensor coordinate system, of the magnetic receiver included in the 3D pointing device 300, and data representing the position and orientation, in the sensor coordinate system, of the magnetic receiver 203 included in the 3D pointing device 302.

A 3D CAD data DB (database) 408 stores data (3D CG rendering data) to generate the image of a virtual object which forms a virtual space. 3D CG rendering data contains data representing the geographical shape and color, texture data, and data representing the position and orientation of the virtual object.

A 3D CG scene graph DB 406 stores scene graph data in which the 3D CG rendering data is hierarchically managed on the basis of the parent-child relationship between virtual objects. This DB also stores information representing the state of each virtual object, including the name and blinking state, selected/unselected state, and section display state of each virtual object. These information can be updated by an operation to be described later. The 3D CG scene graph DB 406 also manages the positions and orientations (to be referred to as a position and orientation of viewpoint hereinafter) of the cameras 102a and 102b.

When data representing the position and orientation, in the sensor coordinate system, of the magnetic receiver included in the 3D pointing device 300 is input from the position/orientation information input unit 404, a position/orientation calculation unit 405 obtains the position and orientation, in the virtual space, of the magnetic receiver included in the 3D pointing device 300 by known calculation by using the received data and conversion data (data representing the relationship between the position and orientation in the virtual space and those in the sensor coordinate system; the position and orientation in one coordinate system can be converted into those in the other coordinate system by the conversion data) between the sensor coordinate system and the virtual space. The position/orientation calculation unit 405 updates the position and orientation of a virtual object associated with the 3D pointing device 300 in advance to the obtained position and orientation. This updating is done by updating the position and orientation of the virtual object in the scene graph data.

A virtual object can be associated with the 3D pointing device 300 by, e.g., the following method. First, a control node is provided in the scene graph. The control node is used to change the position and orientation of a virtual object linked to the control node on the basis of an externally given value.

In this embodiment, a control node to receive data representing the position and orientation, in the sensor coordinate system, of the magnetic receiver included in the 3D pointing device 300 is provided in the scene graph. The node of the virtual object to be associated with the 3D pointing device 300 is linked to the control node.

When data representing the position and orientation, in the sensor coordinate system, of the magnetic receiver included in the 3D pointing device 300 is given to the position/orientation calculation unit 405, the position/orientation calculation unit 405 gives this data to the control node. The CD rendering unit 407 gives this data to the node of the virtual object linked to the control node so that the position and orientation of the virtual object associated with the 3D pointing device 300 are updated to the position and orientation of the 3D pointing device 300.

With this operation, the virtual object can be associated with the 3D pointing device 300. The control node is a known technique, and a detailed description thereof will be omitted.

The number of virtual objects associated with the 3D pointing device 300 is not particularly limited.

When data representing the position and orientation, in the sensor coordinate system, of the magnetic receiver included in the 3D pointing device 302 is input from the position/orientation information input unit 404, the position/orientation calculation unit 405 obtains the position and orientation, in the virtual space, of the magnetic receiver included in the 3D pointing device 302 by known calculation by using the received data and conversion data. The position/orientation calculation unit 405 updates the position and orientation of a virtual object associated with the 3D pointing device 302 in advance to the obtained position and orientation. This updating is done by updating the position and orientation of the virtual object in the scene graph data.

When data representing the position and orientation of the magnetic receiver 201 in the sensor coordinate system is input from the position/orientation information input unit 404, the position/orientation calculation unit 405 obtains the position and orientation of the magnetic receiver 201 in the virtual space by known calculation by using the received data and conversion data. When data representing the position and orientation relationship between the magnetic receiver 201 and the cameras 102a and 102b is used, the positions and orientations of the cameras 102a and 102b in the virtual space can be obtained by known calculation. In this embodiment, the data to obtain the positions and orientation of the cameras 102a and 102b in the virtual space from the position and orientation of the image input device 102 is given in advance as known data. The thus obtained data of the positions and orientation of the cameras 102a and 102b is managed in the 3D CG scene graph DB 406.

A CG rendering unit 407 generates the image of the virtual object seen in accordance with the positions and orientations of the cameras 102a and 102b calculated by the position/orientation calculation unit 405 (positions and orientations of the cameras 102a and 102b managed in the 3D CG scene graph DB 406). The position and orientation of each virtual object in the virtual space are based on data in the 3D CG scene graph DB 406. The image of each virtual object is also based on data in the 3D CG scene graph DB 406. Hence, the image of the virtual object associated with the 3D pointing devices 300 and 302 is laid out in the virtual space on the basis of the positions and orientations of the 3D pointing devices 300 and 302. The image is viewed in accordance with the positions and orientations of the cameras 102a and 102b calculated by the position/orientation calculation unit 405.

Processing of generating the image of a virtual object viewed from a viewpoint having predetermined position and orientation is a known technique, and a detailed description thereof will be omitted.

Image compositing units 402R and 402L respectively superimpose the image of the virtual object viewed in accordance with the position and orientation of the camera 102a and the image of the virtual object viewed in accordance with the position and orientation of the camera 102b, which are generated by the CG rendering unit 407, on the image of the physical space input from the image capture units 401R and 401L and output the images to image generation units 403R and 403L. With this processing, the image of the mixed reality space viewed in accordance with the position and orientation of the camera 102a and the image of the mixed reality space viewed in accordance with the position and orientation of the camera 102b can be generated.

The image generation units 403R and 403L convert the images of the mixed reality space output from the image compositing units 402R and 402L into analog data and output the data to the display devices 101a and 101b as image signals, respectively. The images of the mixed reality space corresponding to the positions of the right and left eyes of the observer who wears the HMD 100 on the head are displayed in front of the respective eyes.

An operation information processing unit 409 generates a panel window by using various kinds of the information registered in the 3D CG scene graph DB 406. The operation information processing unit 409 also reflects, on the panel window, a result obtained when the operator inputs an instruction on the panel window by using the input device 303 or manipulates the 3D pointing device 302 and outputs the data of the operation panel window after reflection to an operation panel generation unit 410. When information about the virtual object is changed by using the input device 303, the operation information processing unit 409 executes a change corresponding to the operation for corresponding data in the 3D CG scene graph DB 406.

Figure 5:
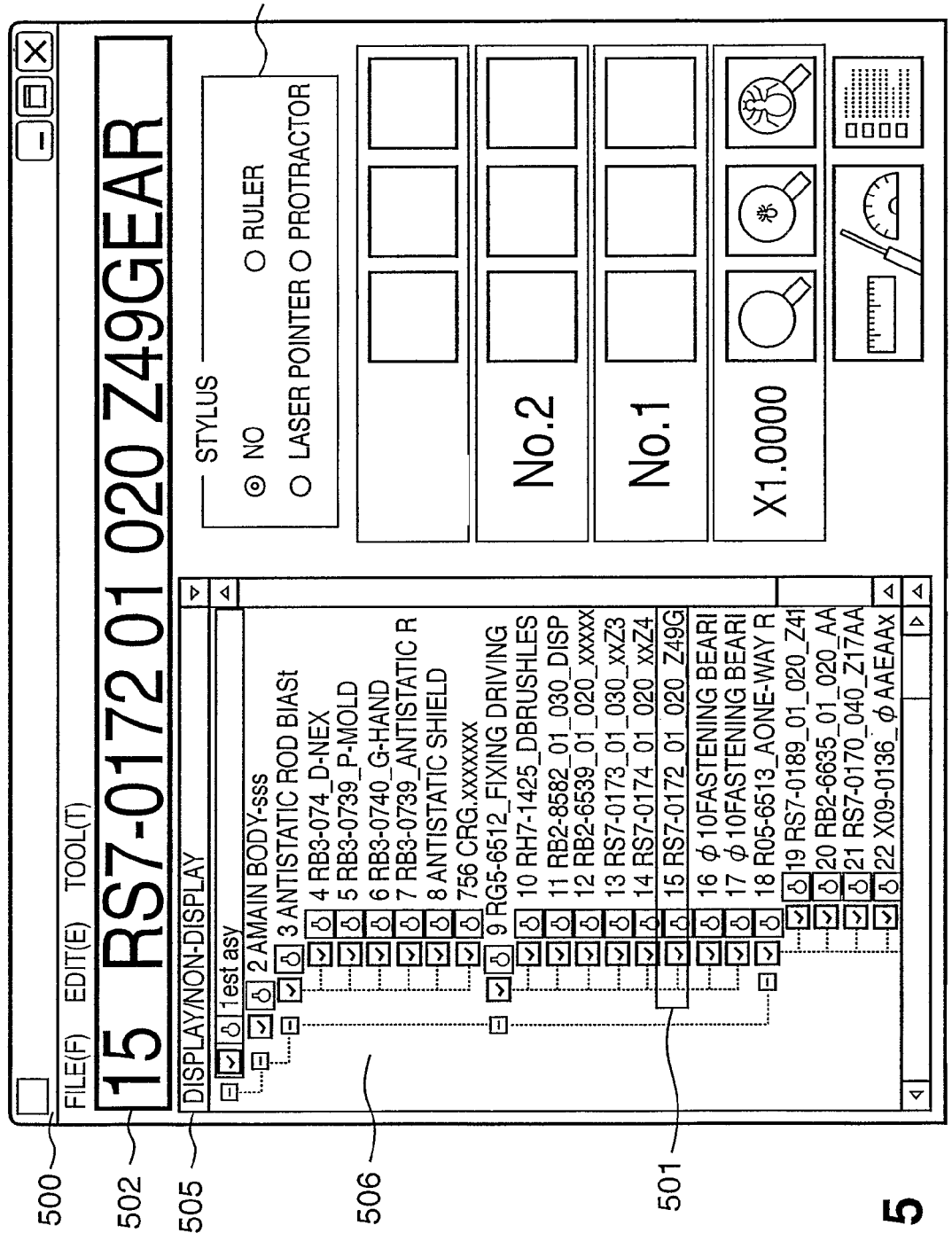
FIG. 5 is a view showing a display example of an operation panel window.

More specifically, the image of the operation panel is displayed on the display screen of the operation panel display device 304, as shown in FIG. 5. FIG. 5 is a view showing a display example of the operation panel window.

Referring to FIG. 5, an operation panel image 500 indicates, e.g., the assembly tree structure of CAD data to select an arbitrary component or enlarge/reduce a component. The operation panel image 500 functions as GUI.

Referring to FIG. 5, a region 506 hierarchically displays information (component name in FIG. 5) about each component of one virtual object in accordance with data in the 3D CG scene graph DB 406. As indicated by 501 in FIG. 5, one component is selected. The component name is displayed in a larger size, as indicated by 502, so that the observer can easily recognize it.

As indicated by a tab 505 in FIG. 5, information about each component is displayed to set display/non-display (whether to display the component on the display devices 101a and 101b of the HMD 100). Display/non-display is set for the selected component (component indicated by 501 in FIG. 5). An operation such as the above-described selection operation on the operation panel is executed by using the input device 303.

For example, when the input device 303 includes a touch panel and buttons, the operator points at a portion on the touch panel with his/her finger. A cursor is displayed at the corresponding position in the region 506. When the cursor is moved to the position where the desired selection target is displayed, and a button is pressed, the selection target is selected.

A region 507 is used to select the function of the 3D pointing device 302. Referring to FIG. 5, "no" is selected. When, e.g., "laser pointer" is selected by using the input device 303, the 3D pointing device 302 functions as a laser pointer. When the 3D pointing device 302 functions as a laser pointer, for example, a linear virtual object having the orientation component of the 3D pointing device 302 as a direction vector is arranged at the position of the 3D pointing device 302. With this operation, a laser virtual object which extends from the tip of the 3D pointing device 302 (near the position of the magnetic receiver 203) in the direction of the 3D pointing device 302 can be arranged.

For example, when the position or orientation of the 3D pointing device 302 is manipulated such that the laser virtual object crosses a component of an observation target virtual object arranged at the position and orientation of the 3D pointing device 300, the component of the observation target virtual object, which crosses the laser virtual object, can be selected. To help visual recognition of the component currently selected by the 3D pointing device 302, information about the selected component may be blinked in the region 506.

The operation panel window is updated by the operation information processing unit 409 in accordance with the operation executed in the above-described manner, as described above. When an operation of changing information about the virtual object, and for example, the operation of setting display/non-display for a selected component is done, the operation information processing unit 409 updates corresponding data in the 3D CG scene graph DB 406 in accordance with the operation contents.

The operation panel generation unit 410 receives operation panel window data for the operation information processing unit 409 and outputs the data to the operation panel display device 304. The operation panel window as shown in FIG. 5 is displayed on display screen of the operation panel display device 304.

FIG. 4 is a flowchart showing processing executed by the units of the computer 400.

The position/orientation measuring device 205 obtains data representing the position and orientation, in the sensor coordinate system, of the magnetic receiver of the 3D pointing device 300 (object manipulation device in FIG. 4), as described above (4010). By using this data and conversion data, the position/orientation information input unit 404 obtains the position and orientation, in the virtual space, of the magnetic receiver of the 3D pointing device 300 by known calculation, as described above (4030). Updating is done by updating the position and orientation of a virtual object associated with the 3D pointing device 300 in the 3D CG scene graph DB 406.

The position/orientation measuring device 205 also obtains data representing the position and orientation of the magnetic receiver 201 in the sensor coordinate system, as described above (4040). By using this data and conversion data, the position/orientation information input unit 404 obtains the position and orientation of the magnetic receiver 201 in the virtual space by known calculation. In addition, the position/orientation information input unit 404 obtains the positions and orientations of the cameras 102a and 102b in the virtual space by known calculation by using data representing the relationship in position and orientation between the magnetic receiver 201 and the cameras 102a and 102b (4040). The obtained data of positions and orientations of the cameras 102a and 102b are managed in the 3D CG scene graph DB 406, as described above.

In parallel to the above-described processing, the image capture units 401R and 401L capture the image of the physical space from the cameras 102a and 102b, respectively (4070), and render the image in a memory (not shown) in the computer 400 (4080).

By using data in the 3D CG scene graph DB 406, the CG rendering unit 407 lays out the virtual object in accordance with its position and orientation contained in the data and generates an image of the virtual object viewed in accordance with the positions and orientations of the cameras 102a and 102b (4060).

The image compositing unit 402R composites the image of the virtual space viewed in accordance with the position and orientation of the camera 102a, which is generated by the CG rendering unit 407, on the image of the physical space captured by the image capture unit 401R, and outputs the data of the composited image to the image generation unit 403R (4090).

Similarly, the image compositing unit 402L composites the image of the virtual space viewed in accordance with the position and orientation of the camera 102b, which is generated by the CG rendering unit 407, on the image of the physical space captured by the image capture unit 401L, and outputs the data of the composited image to the image generation unit 403L (4090).

The image generation unit 403R outputs the composited image (image of mixed reality space) received from the image compositing unit 402R to the display device 101a. The image generation unit 403L outputs the composited image received from the image compositing unit 402L to the display device 101b (4100).

With this processing, the images of the mixed reality space viewed in accordance with the positions and orientations of the right and left eyes of the operator who wears the HMD 100 on the head are provided in front of his/her eyes.

The operation information processing unit 409 generates the image of the operation panel comprising the region to hierarchically display information about each component of the virtual object and the region to manipulate the information about each component by using data in the 3D CG scene graph DB 406. When an instruction to update the operation panel image is input from the input device 303 to select one component, as shown in FIG. 5, and display its name in a large size, as indicated by 502, the operation information processing unit 409 updates the image of the panel on the basis of the instruction.

Hence, the operation information processing unit 409 always receives an instruction from the input device 303 or 3D pointing device 302 (4110). Upon receiving an instruction, the operation information processing unit 409 updates the panel image in accordance with the instruction by, e.g., displaying a component name in a large size, as indicated by 501 (4120 and 4130), and outputs the updated panel image data to the operation panel generation unit 410 (4140).

With this processing, information about each component of the virtual object and a result of instruction by using the input device 303 are displayed on the display screen of the operation panel display device 304.

As described above, according to this embodiment, information about each component of a virtual object is provided on a relatively small screen, that is, the display screen of the HMD. Hence, the observer can easily confirm the information. In addition, the operator can manipulate information about each component while seeing the screen.

In the above description, the HMD 100 is of video see-through type. However, the present invention is not limited to this. An HMD of optical see-through type may be used. In this case, the cameras 102a and 102b are not present. Hence, compositing processing (processing of compositing the image of the physical space and the image of the virtual space) is unnecessary.

In the above description, input to the operation panel display device 304 is done by using the input device 303 or 3D pointing device 302. The operation panel display device 304 may be a touch panel display device. In this case, the input device 303 is omitted.

In this embodiment, only one 3D pointing device (only input device 303) is arranged to manipulate the position and orientation of the virtual object. However, a plurality of 3D pointing devices may be prepared, and one or some of them may be used.

Second Embodiment

In the first embodiment, the respective units shown in FIG. 2 as the functional arrangement of the computer 400 are formed by hardware. However, some to the units shown in FIG. 2 can be implemented by software.

Figure 6:
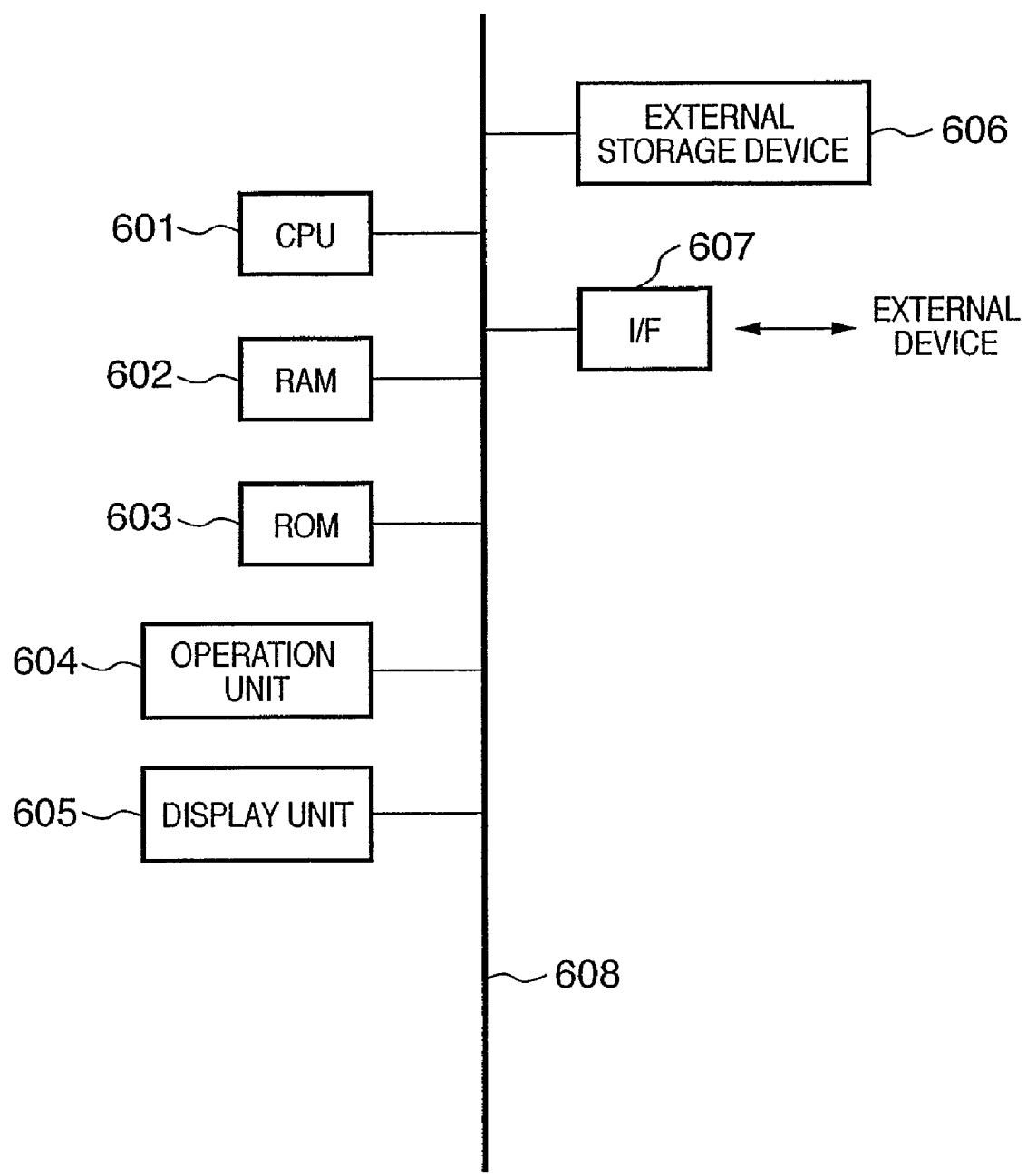
FIG. 6 is a block diagram showing the basic arrangement of a computer 400 according to the second embodiment of the present invention.

FIG. 6 is a block diagram showing the basic arrangement of a computer 400 which is implemented by a computer such as a PC (Personal Computer) or WS (WorkStation).

Referring to FIG. 6, a CPU 601 controls the entire computer by using a program or data stored in a RAM 602 or ROM 603. The CPU 601 also controls data communication with an external device connected through an I/F 607 (to be described later). The CPU 601 also controls the above-described processing for providing a mixed reality image to an HMD 100 and processing for providing a panel image to an operation panel display device 304.

The RAM 602 has an area to temporarily store a program or data loaded from an external storage device 606 and also an area to temporarily store data received through the I/F 607 (to be described later). The RAM 602 also has a work area used by the CPU 601 to execute various kinds of processing.

The ROM 603 stores the boot program and setting data of the computer.

An operation unit 604 includes a keyboard and mouse and can input various kinds of instructions to the CPU 601. The operation unit 604 may be used in place of the above-described input device 303.

A display unit 605 includes a CRT or liquid crystal panel and displays a processing result by the CPU 601 as an image or characters.

The external storage device 606 can store a program or data to make the OS (Operating System) or CPU 601 execute each processing which has been described in the first embodiment as processing executed by the computer 400. Some or all of the programs and data are loaded to the RAM 602 under the control of the CPU 601. The programs to make the CPU 601 execute each processing described in the first embodiment as processing executed by the computer 400 include programs to make the CPU 601 execute the functions of image capture units 401R and 401L, position/orientation information input unit 404, operation panel generation unit 410, position/orientation calculation unit 405, operation information processing unit 409, image compositing units 402R and 402L, CG rendering unit 407, and image generation units 403R and 403L in FIG. 3. A 3D CG scene graph DB 406 shown in FIG. 3 is stored as a DB in the external storage device 606.

Cameras 102a and 102b, display devices 101a and 101b, magnetic receiver 201, position/orientation measuring device 205, input device 303, and operation panel display device 304 are connected to the I/F 607 so that they can communicate with each other through the I/F 607.

A bus 608 connects the above-described units.

Other Embodiment

The object of the present invention can also be achieved by supplying a recording medium (or storage medium) which records software program codes for implementing the functions of the above-described embodiments to a system or apparatus and causing the computer (or CPU or MPU) of the system or apparatus to read out and execute the program codes stored in the recording medium. In this case, the program codes read out from the recording medium implement the functions of the above-described embodiments by themselves, and the recording medium which stores the program codes constitutes the present invention.

The functions of the above-described embodiments are implemented not only when the readout program codes are executed by the computer but also when the operating system (OS) running on the computer performs part or all of actual processing on the basis of the instructions of the program codes.

The functions of the above-described embodiments are also implemented when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

When the present invention is applied to the recording medium, the recording medium stores program codes corresponding to the above-described flowchart (functional arrangement).

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2004-159833 filed on May 28, 2004, the entire contents of which are hereby incorporated by reference herein.

The invention claimed is:

1. An image processing apparatus for compositing an image of a virtual object and an image of a physical space to generate a mixed reality image and causing a HMD to display the mixed reality image, comprising:
   a database which holds 3D CG data and scene graph data, wherein the 3D CG rendering data contains data representing geographical shape and color of the virtual object, texture data, and data representing the position and orientation of the virtual object, and wherein the scene graph data is data in which the 3D CG rendering data is hierarchically managed on the basis of the parent-child relationship between components of the virtual object;
   an image capturing unit which is attached to the HMD and captures the image of the physical space;
   a first measurement unit which measures a position and orientation of the HMD;
   an object manipulation unit which is used by a user wearing the HMD in order to operate a position and orientation of the virtual object;
   a second measurement unit which measures a position and orientation of said object manipulation unit;
   an operation panel which can be operated by the user, arranged at a position in the physical space within a viewing field of said image capturing unit attached to the HMD, displays an operation panel image which is used for editing the virtual object and contains a region for hierarchically displaying information about each of the components in accordance with the scene graph data held in the database, and is capable of receiving a user instruction of editing the virtual object input by the user;
   an operation panel image generation unit which generates the operation panel image by using the data held in said database, and outputs the generated operation panel image to said operation panel;
   a rendering unit which updates the data held in said database according to the user instruction received via said operation panel and the measurement result of said second measurement unit, and renders, by using the updated data, the image of the virtual object according to the measurement results of said first and second measurement units;
   a composition unit which composites the image of the virtual object rendered by said rendering unit and the image of the physical space captured by said image capturing unit to generate the mixed reality image; and
   a HMD, to which said image capturing unit is attached, which displays the mixed reality image generated by said composition unit.

2. The apparatus according to claim 1, wherein said operation panel includes a display device and an operation device, wherein the display device displays the operation panel image, and wherein the operation device is used for inputting the user instruction.

3. The apparatus according to claim 1, wherein the HMD can present the mixed reality image to two eyes of a user who wears the HMD.

4. The apparatus according to claim 1, wherein the image of the virtual object is generated on the basis of 3D CAD data of the virtual object, and said operation panel displays an assembly tree based on the 3D CAD data.

5. The apparatus according to claim 4, wherein a part, which is obtained by enlarging a designated part of the assembly tree included in the operation panel image, includes a component name contained in the assembly tree.

6. An image processing method of compositing an image of a virtual object and an image of a physical space to generate a mixed reality image and causing a HMD to display the mixed reality image, comprising the steps of:
   holding 3D CG rendering data and scene graph data, wherein the 3D CG rendering data contains data representing geographical shape and color of the virtual object, texture data, and data representing the position and orientation of the virtual object, and wherein the scene graph data is data in which the 3D CG rendering data is hierarchically managed on the basis of the parent-child relationship between components of the virtual object;
   providing an image capturing unit, which is attached to the HMD, to capture the image of the physical space;
   measuring a position and orientation of the HMD with a first measurement unit;
   operating an object manipulation unit, by a user wearing the HMD, in order to position and orient the virtual object;
   measuring a position and orientation of the object manipulation unit with a second measurement unit;
   receiving a user instruction of editing the virtual object, input by the user using an operation panel, wherein the operation panel is arranged at a position in the physical space within a viewing field of the image capturing unit attached to the HMD and displays an operation panel image which is used for editing the virtual object, and contains a region for hierarchically displaying information about each of the components in accordance with the scene graph data held in the database;

generating the operation panel image by using the data held in the database with an operation panel image generation unit and outputting the generated operation panel image to the operation panel;

updating the data held in the database according to the user instruction received via the operation panel and the measurement result of the second measurement unit, and rendering, by using the updated data, the image of the virtual object according to the measurement results of the first and second measurement units;

compositing the rendered image of the virtual object and the captured image of the physical space to generate the mixed reality image; and displaying the generated mixed reality image on the HMD, to which the image capturing unit is attached.

7. A non-transitory computer-readable storage medium encoded with a computer program for an image processing method of compositing an image of a virtual object and an image of a physical space to generate a mixed reality image and causing a HMD to display the mixed reality image, comprising the steps of: holding 3D CG rendering data and scene graph data, wherein the 3D CG rendering data contains data representing geographical shape and color of the virtual object, texture data, and data representing the position and orientation of the virtual object, and wherein the scene graph data is data in which the 3D CG rendering data is hierarchical managed on the basis of the parent-child relationship between components of the virtual object; providing an image capturing unit, which is attached to the HMD, to capture the image of the physical space; measuring a position and orientation of the HMD with a first measurement unit; operating an object manipulation unit, by a user wearing the HMD, in order to position and orient the virtual object; measuring a position and orientation of the object manipulation unit with a second measurement unit; receiving a user instruction of editing the virtual object, input by the user using an operation panel, wherein the operation panel is arranged at a position in the physical space within a viewing field of the image capturing unit attached to the HMD and displays an operation panel image which is used for editing the virtual object, and contains a region for hierarchically displaying information about each of the components in accordance with the scene graph data held in the database; generating the operation panel image by using the data held in the database with an operation panel image generation unit and outputting the generated operation panel image to the operation panel arranged at the position in the physical space within the viewing field of said image capturing unit; updating the data held in the database according to the user instruction received via the operation panel and the measurement result of the second measurement unit, and rendering, by using the updated data, the image of the virtual object according to the measurement results of the first and second measurement units; compositing the rendered image of the virtual object and the captured image of the physical space to generate the mixed reality image; and displaying the generated mixed reality image on the HMD, to which the image capturing unit is attached.

* * * * *